(12) United States Patent
Lang et al.

(10) Patent No.: US 10,024,466 B2
(45) Date of Patent: Jul. 17, 2018

(54) METAL PIPE HAVING A CONNECTOR

(71) Applicant: VOITH PATENT GMBH, Heidenheim (DE)

(72) Inventors: Markus Lang, Neuching (DE); Patrick Tichelmann, Hallbergmoos (DE)

(73) Assignee: Voith Patent GmbH, Heidenheim (DE)

( * ) Notice: Subject to any disclaimer, the term of this patent is extended or adjusted under 35 U.S.C. 154(b) by 453 days.

(21) Appl. No.: 14/786,233

(22) PCT Filed: Apr. 4, 2014

(86) PCT No.: PCT/EP2014/056766
§ 371 (c)(1),
(2) Date: Oct. 22, 2015

(87) PCT Pub. No.: WO2014/173652
PCT Pub. Date: Oct. 30, 2014

(65) Prior Publication Data
US 2016/0097473 A1    Apr. 7, 2016

Related U.S. Application Data

(60) Provisional application No. 61/815,016, filed on Apr. 23, 2013, provisional application No. 61/821,938, filed on May 10, 2013.

(30) Foreign Application Priority Data

Apr. 22, 2013  (DE) .................. 10 2013 207 206
May 8, 2013    (DE) .................. 10 2013 208 458

(51) Int. Cl.
*F16L 15/00*     (2006.01)
*E21B 17/02*     (2006.01)
(Continued)

(52) U.S. Cl.
CPC ............ *F16L 15/001* (2013.01); *E21B 17/02* (2013.01); *E21B 17/023* (2013.01); *E21B 17/042* (2013.01); *F16L 15/06* (2013.01)

(58) Field of Classification Search
CPC ...... E21B 17/023; E21B 17/02; E21B 17/028; F16L 15/001
(Continued)

(56) References Cited

U.S. PATENT DOCUMENTS 2,075,427 A * 3/1937 Church ................. E21B 17/042
                                                    285/332.2
3,004,779 A * 10/1961 Cullen .................... F16L 33/01
                                                    285/222.5
(Continued)

FOREIGN PATENT DOCUMENTS

DE    29914915 U1    2/2000
GB     2230832 A    10/1990
(Continued)

*Primary Examiner* — David Bochna
(74) *Attorney, Agent, or Firm* — Laurence A. Greenberg; Werner H. Stemer; Ralph E. Locher

(57) ABSTRACT

A pipe element is formed of a metal pipe and at least one metal connector, fastened to an end of the metal pipe such that torques and axial forces can be transmitted between the metal pipe and the metal connector. The metal connector has thread, in particular a conical thread, or a flange, by way of which the metal connector can be screwed to another metal connector of an additional pipe element in order to connect two pipe elements. The metal connector is screwed to an inner sleeve by way of a cylindrical thread so that the metal pipe is a really clamped between the metal connector on the outside and the inner sleeve on the inside in a connection region. The connection region is conically tapered toward the pipe end.

20 Claims, 2 Drawing Sheets

(51) Int. Cl.
*E21B 17/042* (2006.01)
*F16L 15/06* (2006.01)

(58) Field of Classification Search
USPC .......................................... 285/333, 334, 256
See application file for complete search history.

(56) References Cited

U.S. PATENT DOCUMENTS

| | | | | |
|---|---|---|---|---|
| 3,186,738 | A * | 6/1965 | Dalrymple .......... | E21B 17/1007 285/213 |
| 4,813,715 | A | 3/1989 | Policelli | |
| 5,332,049 | A | 7/1994 | Tew | |
| 8,474,875 | B2 * | 7/2013 | Ross ...................... | E21B 47/01 285/333 |
| 8,684,851 | B2 * | 4/2014 | Slack ..................... | E21B 17/07 464/163 |
| 9,377,553 | B2 * | 6/2016 | Wright ................. | E21B 17/028 |
| 9,431,813 | B2 * | 8/2016 | Menezes ................ | E21B 17/028 |
| 9,689,514 | B2 * | 6/2017 | Leslie ................... | E21B 17/028 |
| 9,810,353 | B2 * | 11/2017 | Leslie ................... | E21B 17/028 |
| 9,845,645 | B2 * | 12/2017 | Hughes ................. | E21B 17/028 |
| 2011/0115218 | A1 * | 5/2011 | Olivier, III ............ | E21B 17/042 285/334 |
| 2013/0186669 | A1 * | 7/2013 | Chabas ................. | E21B 17/028 174/47 |
| 2014/0102806 | A1 * | 4/2014 | Millet ................... | E21B 17/028 175/315 |
| 2015/0292273 | A1 * | 10/2015 | Lim ...................... | E21B 17/028 166/65.1 |
| 2016/0024855 | A1 * | 1/2016 | Lamik-Thonhauser | E21B 17/028 175/40 |

FOREIGN PATENT DOCUMENTS

GB 2522734 B * 10/2017
WO 9813574 A1 4/1998

* cited by examiner

METAL PIPE HAVING A CONNECTOR

BACKGROUND OF THE INVENTION

Field of the Invention

The invention relates to a pipe element which comprises a metal pipe and at least one metal connector which is fastened to an end of the metal pipe in such a way that torques and axial forces can be transmitted between the metal pipe and the metal connector, wherein the metal connector has a thread, in particular a conical thread, or a flange by means of which thread or flange the metal connector can be screwed to another metal connector of an additional pipe element in order to connect two pipe elements. Pipe elements of this kind are used by way of example to make up from these longer drilling rods such as are required for oil drilling. The invention further relates to a method for manufacturing pipe elements of this kind. In the prior art the metal pipe is connected to the metal connector by friction welding, as shown by way of example in WO 98/13574 A1. One drawback with this type of connection is that welding in the region of the connection causes a change in the structure in the metal pipe and in the metal connector which has a negative effect on the mechanical properties of the high-alloy steels which are used. A special heat treatment is therefore necessary after welding which makes the manufacture complicated and expensive.

BRIEF SUMMARY OF THE INVENTION

The object of the invention is to develop a pipe element of this kind having a connection between the metal pipe and metal connector which is easier to fit and more reliable.

This is achieved for the pipe element according to the invention in that the metal connector is screwed to an inner sleeve by means of a cylindrical thread in such a way that the metal pipe is clamped in a planar manner between the metal connector on the outside and the inner sleeve on the inside in a connection region which is conically tapered toward the pipe end. Through this force-locking fastening of the metal connector on the metal pipe any additional after treatment is no longer required. The clamping force can be fixed over the pitch and length of the conical connection region and can be adapted to the relevant requirements. By tapering conically toward the end of the pipe is to mean that the diameter decreases in the connection region outwards towards the cylindrical thread.

Connections can thereby be produced by means of which great torque and high axial forces can be transmitted. Thus pipe elements are also possible for drilling rods as used for oil drilling. In the case of pipe elements for drilling rods, metal connectors can preferably be provided with a conical thread for connecting two pipe elements, more particularly with the standard oil industry API threads. A further advantage of the invention is that the screw-type connection between the metal connector and metal pipe can be designed releasable so that the metal connector can by way of example be replaced or repaired when the conical thread is worn out without having to replace or transport the entire pipe element. This is of great advantage considering the length of up to 15 m in the case of such pipe elements.

The pipe elements according to the invention can equally be used for other types of pipes or pipelines or for pipe-like drive shafts. By way of example for pipe connections for offshore oil production (for so-called risers) or as linings of drilling holes (so-called casings or liners). In the case of pipe-like drive shafts the metal connector is preferably provided with a flange for connecting with an additional pipe element.

Steel is preferably considered as the material for metal connectors and metal pipes. It is also possible for the pipe element according to the invention that the metal pipe and/or the metal connector are made from aluminium alloys, titanium, titanium alloys, cast iron or cast steel.

Further advantageous features of the design according to the invention which improve the reliability and assembly of the connection as well as the usability of the pipe element are found in the dependent claims.

In addition to the one first metal connector, a second metal connector can be provided on the opposite pipe end, which is connected to the metal pipe as claimed, more particularly is connected exactly like the first metal connector. Longer drill pipe strings or other pipelines can be made up from pipe elements of this kind having two metal connectors. Preferably, one metal connector has a conical inner thread and the second metal connector has a conical outer thread. Thus structurally identical pipe elements are produced which makes their use easier. Alternatively one pipe element can also be designed with two metal connectors with conical inner thread and one pipe element can be designed with two metal connectors with conical outer thread, which can then be assembled in alternation.

In order to achieve a particularly solid connection it is advantageous to design the metal connector so that it has on the inside a conical connection region which is in contact with the outside of the connection region of the metal pipe, and has a pitch angle of the cone between 0.1° and 30°, preferably between 0.5° and 5°, in relation to the axis of the pipe. A sufficiently long connection region is produced through this pitch angle in order to guarantee a good press fit in the clamping region.

It can furthermore be advantageous that the inner sleeve has on the outside a conical connection region which is in contact with the connection region of the metal pipe, and has a pitch angle of the cone between 0.1° and 30°, preferably between 0.5° and 5° in relation to the axis of the pipe.

In order to enable a good connection with the metal pipe the roughness on the outside of the connection region (3.1) of the inner sleeve and/or on the inside of the connection region (1.1) of the metal pipe should be sufficiently high.

A particularly reliable connection and a simplified production possibility are produced when the wall thickness of the metal pipe in the connection region remains substantially constant along the axial direction. I.e. that the pitch angle of the conical region is the same on the inner sleeve and on the metal connector in the connection region, which leads to a particularly good clamping fit. The wall thickness of the metal pipe in the connection region is preferably between 3 mm and 20 mm, and more particularly preferred between 5 mm and 12 mm in order to be able to withstand the strain.

The stability against internal pressure, as well as the wear resistance can be substantially increased if the metal pipe, more particularly in the entire region which is not covered by the metal connector or an additional metal connector, is surrounded by a coating of fibre-reinforced plastics. As fibre-reinforced plastics can be considered in particular CFK (carbon fibre-reinforced plastics). The coating can be produced by way of example by wrapping the metal pipe with one or more layers which are then hardened. In order to achieve a sufficient effect, the thickness of the coating should preferably amount to between 2 mm and 8 mm.

In many applications it is desired that data or energy or both can be transmitted via the pipe elements. For this a cable can be provided which extends from one pipe end to the other pipe end and which is connected to a plug which is located inside the metal connector and which is suitable for producing an electrical connection to another plug or cable in a further pipe element when the pipe element is screwed to the additional pipe element by way of the thread or the flange. It is also possible to provide several cables and/or several plugs on one pipe element. If the metal pipe is surrounded with a coating of fibre-reinforced plastics the or each cable can be located between the metal pipe and this plastics coating so that they are protected against damage. The plug can be designed more particularly in ring-shaped fashion. By plug is meant here in general a component part which is suitable for producing an electrical connection with which data or energy can be transmitted. The electrical connection between the pipe elements can be produced by physical contact of the plug with a counter contact or can arise wirelessly by electromagnetic coupling of the plug to a counter member. Several cables and/or several plugs can hereby also be provided on one pipe element.

The plug is protected particularly well against the influences from the interior of the pipe in which oil or another medium can flow, if the inner sleeve has a protective shield adjoining the cylindrical thread which is designed so that the plug seen in the radial direction lies completely between the metal connector and the inner sleeve. The inner sleeve is preferably designed so that after screwing together with an additional pipe element it seals the plug from the interior.

So that the cable can be guided safely against damage from the metal pipe to the plug when screwing on the metal connector, the inner sleeve preferably has an axial groove in the cylindrical thread or an axial longitudinal bore in the material underneath the cylindrical thread, through which the cable is guided from the metal pipe to the plug. The groove is easy to produce. The longitudinal bore has the advantage that the thread is thereby not interrupted and not weakened. If several cables are provided then also several grooves or longitudinal bores can be provided spread out around the periphery.

In order also to be able to guide the cable through the connection region without damage it is advantageous if the metal pipe has in the connection region an axial groove which is arranged in the extension of the axial groove in the cylindrical thread or the axial longitudinal bore underneath the cylindrical thread on the inner sleeve.

Since in many cases a fluid medium such as for example oil or drilling fluid flows through the pipe element, it is important to keep the pressure drop low. For this it is advantageous if the inner surface of the counter sleeve has an internal profile which runs completely continuously in the axial direction without edges or steps. This continuous nozzle-like path leads to a pipe element with optimized flow property with low pressure drop in the region of the connecting sites of the different pipe elements. Pipe elements known up until now have the drawback that they cause greater pressure drops in the region of the connections. Through the type of connection according to the invention between the metal connector and pipe it is possible to produce an internal profile with optimized flow property through the counter sleeve.

For the method according to the invention for manufacturing a pipe element of the type described above the object is achieved in that the following steps are carried out:

a) the inner sleeve is mounted in an initially still cylindrical pipe end of the metal pipe so that a conically designed connection region of the inner sleeve is located in the metal pipe;

b) the metal pipe is deformed at this pipe end, preferably rolled, so that a connection region is produced which tapers conically towards the pipe end and which is in contact with the conical connection region;

c) the metal connector is screwed onto the inner sleeve by means of the cylindrical thread so that the metal pipe is clamped in planar manner in the connection region between the inner sleeve and metal connector.

A pipe element can thus be produced with a reliable connection which can also transmit higher torques and axial forces without the need for complicated after treatments. As a result of the force-locking engagement which is produced via the cylindrical thread in connection with the conical connection region it is possible to produce a connection which can also be released, which offers the advantages mentioned above.

A pipe element can also be made with a cable connection wherein a cable is attached from one pipe end to the other pipe end on the outside of the metal pipe, the cable is laid in an axial groove in the cylindrical thread or through an axial longitudinal bore in the material underneath the cylindrical thread of the inner sleeve, as well as in an adjoining groove in the connection region of the metal pipe, and the cable is attached to a plug before step c) is carried out. Several cables and/or several plugs can also be attached in the same way. The cables are protected by the groove or the longitudinal bore against damage when the metal connector is screwed onto the inner sleeve.

The metal pipe can furthermore be wrapped in a coating of fibre-reinforced plastics, preferably in the entire region which is not covered by the metal connector or an additional metal connector. After wrapping, the pipe can be subjected to a simple heat treatment to harden the plastics coating, for example in a furnace. CFK (carbon fibre-reinforced plastics) is preferably used for this coating. In the case of a pipe element with cable connection the cable can be attached to the metal pipe before wrapping so that it is later protected by the coating. The plug can be mounted after hardening.

Further advantageous features of the invention will now be explained using embodiments and with reference to the drawings. The said features can advantageously not only be transposed in the illustrated combination, but can also be combined with one another individually.

DESCRIPTION OF THE INVENTION

Figure 1:
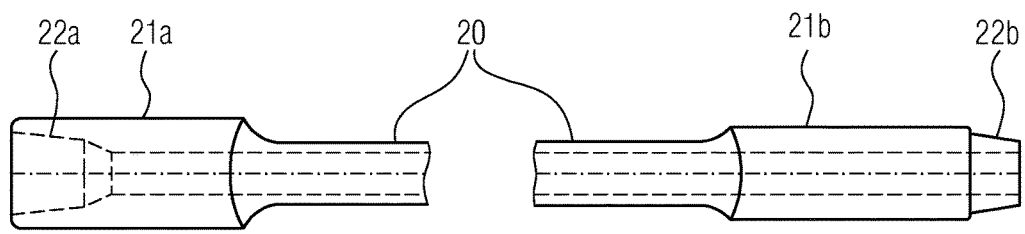
FIG. 1 a drill pipe according to the prior art

The figures will be described in more detail below. FIG. 1 shows a drilling rod element according to the prior art. The metal pipe 20 is connected at each pipe end to a metal connector 21a, 21b via friction welding. The one metal connector 21a has a conical inner thread 22a, the other metal connector 21b has a conical outer thread. Longer drilling rods can be thereby be made up. If one of the conical threads 22a or 22b is worn out then the entire drilling rod element has to be replaced or transported away for repair work since the metal connectors are connected non-detachably to the metal pipe 20.

Figure 2:
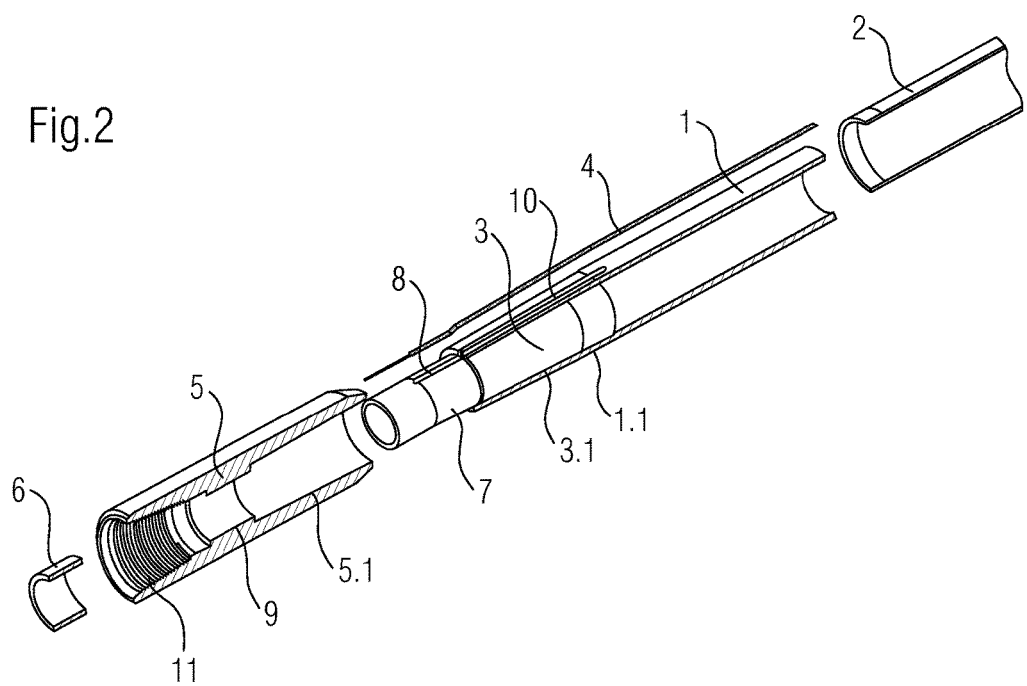
FIG. 2 a pipe element according to the invention with cable in an exploded view

FIG. 2 shows an example for a pipe element according to the invention. The metal pipe 1 is designed in the connection region 1.1 tapering conically towards the pipe end and has an axial groove 10 in this region. Inside the pipe end there is an inner sleeve 3 which is fitted and adjoins the inside wall of the metal pipe 1 by its conical connection region 3.1. The inner sleeve 3 has a cylindrical thread 7 which is interrupted by an axial groove 8. The groove 8 on the inner sleeve and the groove 10 on the connection region of the metal pipe lie flush with one another so that the cable 4 can be laid therein. The metal pipe is wrapped with a coating 2 of fibre-reinforced plastics, preferably CFK. The plug 6 is connected to the cable 4, and the metal connector 5 is screwed onto the inner sleeve 3 by way of the cylindrical thread 9, 7. The metal pipe 1 is thereby clamped in the connection region 1.1 between the connection region 3.1 of the inner sleeve and the connection region 5.1 of the metal connector. A connection is formed which can transmit torques and axial forces. The metal connector 5 has at its free end a conical inner thread 11 with which the pipe element can be screwed up to an additional pipe element.

Alternatively the metal connector can also have a conical outer thread on a spigot or a different thread. The metal connector can also have a flange by means of which it can be screwed to another metal connector.

The illustration is cut away on the right hand side. The other end of the pipe element can have a second metal connector which is connected to the metal pipe 1 in a similar manner. The second metal connector has in the illustrated design preferably a conical outer thread matching the first metal connector 5.

The illustrated pipe element is particularly suitable for drilling rods as used in the drilling oil industry. With such drilling rods the thread diameter of the cylindrical thread 7, 9 is mostly between 80 and 180 mm. A particularly preferred embodiment for a drilling rod in this diameter range has a cylindrical thread with a length between 50 and 150 mm. Independently of the said thread length with such pipe elements the axial length of the connection region is preferably between 150 and 250 mm.

Figure 3:
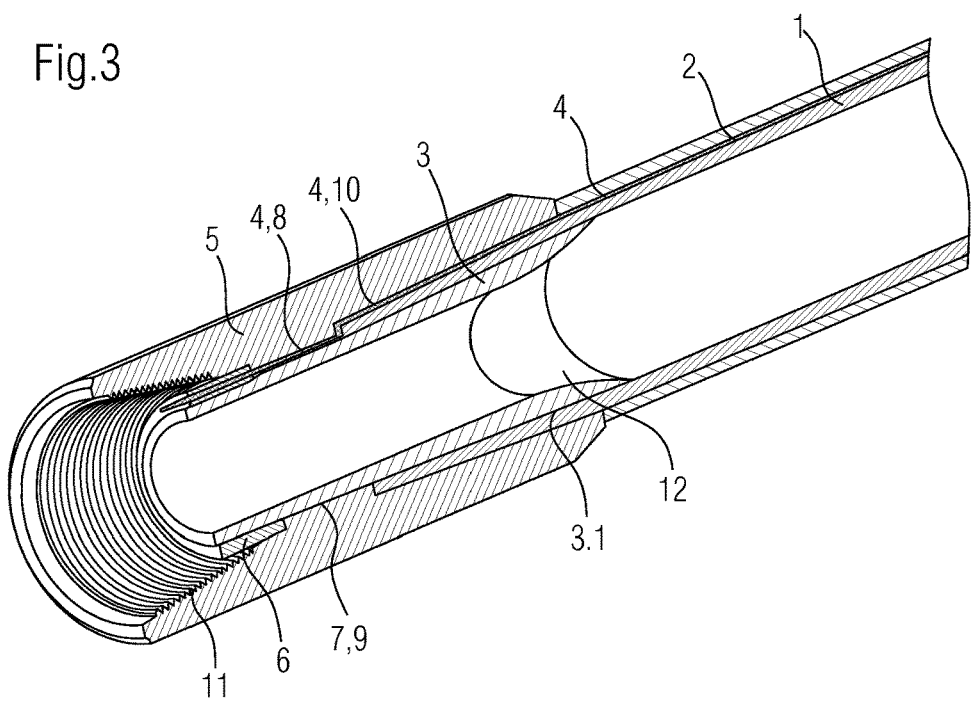
FIG. 3 pipe element according to the invention with cable

FIG. 3 shows one end of the assembled pipe element on an enlarged scale. The metal pipe 1 is clamped in the connection region 1.1 between the metal connector 5 on the outside and the inner sleeve 3 on the inside. The connection region is dimensioned sufficiently large so that higher torques and axial forces can be transmitted. The cable 4 runs protected under the coating 2 of fibre-reinforced plastics. In the connection region it is located in the groove 10 and in the region of the cylindrical thread 7, 9 in the groove 8. At the end it is attached to a plug 6. The plug lies completely between the inner sleeve 3 and metal connector 5 and is designed so that when screwing two pipe elements together an electrical connection is produced for data and/or energy transmission.

Figure 4:
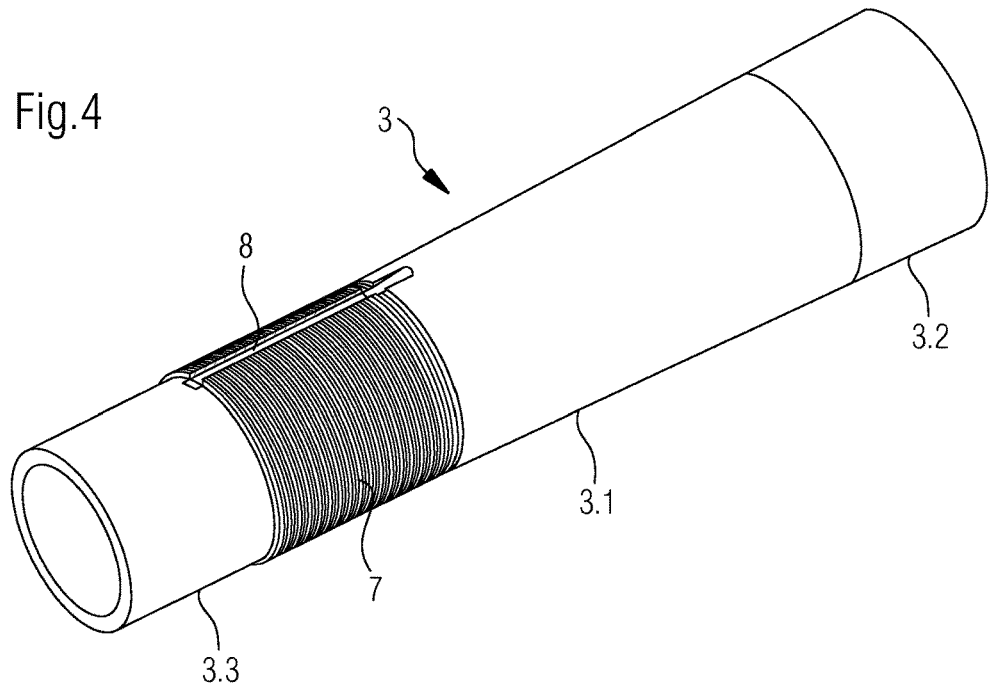
FIG. 4 detailed view of the inner sleeve

The inner sleeve 3 alone is seen in FIG. 4. It can clearly be seen that the groove 8 is in the cylindrical thread 7. The conical connection region 3.1 changes in this case into a cylindrical region 3.2 at the thicker end of the inner sleeve 3. At the thinner end there is the protective shield 3.3, here designed as a cylindrical region, on which the plug 6 is mounted.

LIST OF REFERENCE NUMERALS

1 Metal pipe
2 Composite wrapping
3 Inner sleeve
3.1 Conical connection region
3.2 Cylindrical region at thick end
3.3 Protective shield at thin end
4 Cable
5 Metal connector
5.1 Conical connection region
6 Plug
7 Cylindrical thread on inner sleeve
8 Groove in thread
9 Cylindrical thread in metal connector
10 Groove in the metal pipe
11 Conical thread
12 Inner profile of the inner sleeve
20 Metal pipe
21a First metal connector
21b Second metal connector
22a Conical inner thread
22b Conical outer thread

The invention claimed is:

1. A pipe element, comprising:
a metal pipe having a pipe end and a connection region tapering conically toward said pipe end;
at least one metal connector fastened at said pipe end of said metal pipe to enable torques and axial forces to be transmitted between said metal pipe and said metal connector;
said metal connector being formed with a thread or a flange configured for screwing said metal connector to another metal connector of a further pipe element in order to connect two pipe elements;
an inner sleeve formed with a cylindrical thread screwed to and meshing with a cylindrical thread formed in said metal connector;
said metal pipe being areally clamped between said metal connector on the outside and said inner sleeve on the inside in said connection region of said metal pipe.

2. The pipe element according to claim 1, wherein said thread of said metal connector for screwing to the other metal connector is a conical thread.

3. The pipe element according to claim 1, wherein said metal connector is a first metal connector and said pipe end of said metal pipe is a first pipe end, and which comprises a second metal connector connected at said second pipe end, said second metal connector being identical to said first metal connector and being connected to said metal pipe identically as said first metal connector.

4. The pipe element according to claim 1, wherein said metal connector has an inner conical connection region in contact with said connection region of said metal pipe, and wherein a pitch angle of said conical connection region lies between 0.1° and 30° relative to an axis of said metal pipe.

5. The pipe element according to claim 1, wherein said inner sleeve has an outer conical connection region in contact with said connection region of said metal pipe, and wherein a pitch angle of said conical connection region lies between 0.1° and 30° relative to an axis of said metal pipe.

6. The pipe element according to claim 5, wherein the pitch angle of said conical connection region lies between 0.5° and 5° relative to the axis of said metal pipe, and a pitch angle of an inner conical connection region of said metal connector in contact with said connection region of said metal pipe lies between 0.5° and 5° relative to the axis of said metal pipe.

7. The pipe element according to claim 1, wherein a wall thickness of said metal pipe remains substantially constant in said connection region along an axial direction and lies between 3 mm and 20 mm.

8. The pipe element according to claim 7, wherein the wall thickness of said metal pipe in said connection region lies between 5 mm and 12 mm.

9. The pipe element according to claim 1, which comprises a coating of fiber-reinforced plastics encasing said metal pipe in a surface thereof not covered by said metal connector or a further metal connector.

10. The pipe element according to claim 9, wherein a thickness of the coating is between 2 mm and 8 mm.

11. The pipe element according to claim 1, which comprises a cable extending from one end of said pipe to another end of said pipe and connected to plug disposed inside said metal connector, said cable and said plug being configured for producing an electrical connection to another plug or cable in another pipe element, when the pipe element is screwed to the further pipe element by way of the thread or the flange.

12. The pipe element according to claim 11, wherein said inner sleeve has a protective shield adjoining said cylindrical thread and configured such that said plug, viewed in the radial direction, lies completely between said metal connector and said inner sleeve.

13. The pipe element according to claim 11, wherein said inner sleeve is formed with an axial groove in said cylindrical thread or an axial longitudinal bore in a material underneath said cylindrical thread, for guiding said cable from said metal pipe to said plug.

14. The pipe element according to claim 13, wherein said metal pipe is formed with an axial groove in said connection region disposed on said inner sleeve in an extension of said axial groove in said cylindrical thread or said axial longitudinal bore underneath said cylindrical thread.

15. The pipe element according to claim 11, wherein an inner face of said inner sleeve is formed with an inner profile running completely continuously in the axial direction without edges or steps.

16. A method of manufacturing a pipe element according to claim 1, the method comprising the following steps:
a) mounting an inner sleeve in an initially cylindrical pipe end of a metal pipe with a conical connection region of the inner sleeve located in the metal pipe;
b) deforming the initially cylindrical pipe end of the metal pipe to produce a connection region that tapers conically towards the pipe end and which is in contact with the conical connection region of the inner sleeve; and
c) screwing a metal connector by way of a cylindrical thread onto the inner sleeve to thereby clamp the metal pipe in planar manner in the connection region between the inner sleeve and the metal connector.

17. The method according to claim 16, wherein the deforming step comprises rolling the metal pipe onto the conical connection region of the inner sleeve.

18. The method according to claim 16, which comprises bringing a cable from one pipe end to the other pipe end on the outside of the metal pipe, laying the cable in an axial groove formed in the cylindrical thread or through an axial longitudinal bore in a material underneath the cylindrical thread of the inner sleeve, and also in an adjoining groove in the connection region of the metal pipe, and attaching the cable to a plug before carrying out step c).

19. The method according to claim 16, which comprises wrapping the metal pipe with a coating of a fiber-reinforced plastic.

20. The method according to claim 19, which comprises wrapping an entire region of the metal pipe that is not covered by the metal connector or a further metal connector.

* * * * *